（12） United States Patent
Im et al.

(10) Patent No.: US 10,642,112 B2
(45) Date of Patent: May 5, 2020

(54) ARRAY SUBSTRATE, DISPLAY PANEL AND DISPLAY DEVICE

(71) Applicant: BOE TECHNOLOGY GROUP CO., LTD., Beijing (CN)

(72) Inventors: Yunsik Im, Beijing (CN); Seoyoon Kim, Beijing (CN); Yoonsung Um, Beijing (CN); Liwei Liu, Beijing (CN); Hui Zhang, Beijing (CN); Shiyu Zhang, Beijing (CN); Ming Zhu, Beijing (CN); Haijun Niu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/229,141

(22) Filed: Dec. 21, 2018

(65) Prior Publication Data

US 2019/0243176 A1    Aug. 8, 2019

(30) Foreign Application Priority Data

Feb. 6, 2018 (CN) .......................... 2018 1 0117865

(51) Int. Cl.
  *G09F 13/04* (2006.01)
  *G02F 1/1362* (2006.01)
  *G02F 1/1335* (2006.01)

(52) U.S. Cl.
  CPC ...... *G02F 1/1362* (2013.01); *G02F 1/133553* (2013.01); *G02F 1/133514* (2013.01); *G02F 2001/136222* (2013.01); *G02F 2203/055* (2013.01)

(58) Field of Classification Search
  None
  See application file for complete search history.

(56) References Cited

U.S. PATENT DOCUMENTS

2017/0146859 A1* 5/2017 Lin .................... G02F 1/13362

\* cited by examiner

*Primary Examiner* — Vip Patel
(74) *Attorney, Agent, or Firm* — Calfee, Halter & Griswold LLP (57) ABSTRACT

An array substrate includes a base substrate and a selective reflective layer. The selective reflective layer on the base substrate, and includes at least one selective reflective unit. The selective reflective unit is configured to reflect light of a first wavelength range and transmit light of a second wavelength range other than the first wavelength range.

19 Claims, 4 Drawing Sheets

ARRAY SUBSTRATE, DISPLAY PANEL AND DISPLAY DEVICE

CROSS REFERENCE

This application is based upon and claims priority to Chinese Patent Application No. 201810117865.4, filed on Feb. 6, 2018, the entire contents thereof are incorporated herein by reference.

TECHNICAL FIELD

The present disclosure relates to the technical field of liquid crystal display, in particular to an array substrate, a display panel comprising the array substrate, and a display device including the display panel.

BACKGROUND

With the development of thin film field effect transistor display (TFT-LCD Display) technology and advances in industrial technology, the production cost of liquid crystal display devices is reduced, and the manufacturing process is becoming more and more perfect. TFT-LCD has replaced the cathode ray tube display so as to be the mainstream technology of the flat panel display field. Furthermore, because of its own advantages, TFT-LCD becomes an ideal display device in the market and for consumers.

SUMMARY

The present disclosure provides the following technical solutions.

According to the first aspect, the disclosure provides an array substrate, comprising: a base substrate; and a selective reflective layer on the base substrate. The selective reflective layer comprises at least one selective reflective unit, the selective reflective units are configured to reflect light of a first wavelength range and transmit light of a second wavelength range.

In an exemplary embodiment of the present disclosure, the selective reflective units comprise at least one of a green selective reflective unit, a blue selective reflective unit, and a red selective reflective unit, wherein the green selective reflective unit is configured to reflect green light and transmit red light and blue light, and the blue selective reflective unit is configured to reflect blue light and transmit red light and green light, and the red selective reflective unit is configured to reflect red light and transmit green light and blue light.

In an exemplary embodiment of the present disclosure, the selective reflective units comprise a plurality of first dielectric layers and a plurality of second dielectric layers, which are alternately stacked, and the refractive index of the first dielectric layer is greater than that of the second dielectric layer, and the number of the first dielectric layers is larger than that of the second dielectric layer by one.

In an exemplary embodiment of the present disclosure, the first dielectric layer is an $Al_2O_3$ layer and the second dielectric layer is a $SiO_2$ layer, wherein both the thickness of the first dielectric layer and the thickness of the second dielectric layer are a quarter of the first wavelength range.

According to another aspect, the disclosure provides a display panel, including: an array substrate including a base substrate and a selective reflective layer, wherein the selective reflective layer on the base substrate and includes at least one selective reflective unit, the selective reflective unit is configured to reflect light of a first wavelength range and transmit light of a second wavelength range; and a color film substrate arranged opposite to the array substrate.

In an exemplary embodiment of the present disclosure, the color film substrate includes a plurality of red filter units, a plurality of green filter units, and a plurality of blue filter units.

In an exemplary embodiment of the present disclosure, the selective reflective layer includes a plurality of green selective reflective units, projections of the plurality of red filter units and the plurality of blue filter units on the base substrate in a direction of light emitting are respectively overlapped with projections of the green reflective units.

In an exemplary embodiment of the present disclosure, the selective reflective layer further comprises a plurality of red selective reflective units and/or a plurality of blue selective reflective units, projections of the plurality of green filter units in a direction of light emitting on the base substrate are respectively overlapped with projections of the red reflective units and/or the blue reflective units.

In an exemplary embodiment of the present disclosure, the selective reflective layer comprises a plurality of red selective reflective units, wherein the red selective reflective units are configured to reflect red light and transmit green light and blue light, projections of the plurality of green filter units and the plurality of blue filter units in a direction of light emitting on the base substrate are respectively overlapped with projections of red reflective unit.

In an exemplary embodiment of the present disclosure, the selective reflective layer further comprise a plurality of green selective reflective units and/or a plurality of blue selective reflective units, wherein the green selective reflective unit is configured to reflect green light and transmit red light and blue light, and the blue selective reflective unit is configured to reflect blue light and transmit red light and green light, projections of the plurality of red filter units in a direction of light emitting on the base substrate are respectively overlapped with projections of the green reflective units and/or the blue reflective units.

In an exemplary embodiment of the present disclosure, the selective reflective layer comprises a plurality of blue selective reflective units, and the blue selective reflective unit is configured to reflect blue light and transmit red light and green light, projections of the plurality of green filter units and the plurality of red filter units in a direction of light emitting on the base substrate are respectively overlapped with projections of the blue reflective units.

In an exemplary embodiment of the present disclosure, the selective reflective layer further comprise a plurality of green selective reflective unit and/or a plurality of red selective reflective unit, wherein the green selective reflective unit is configured to reflect green light and transmit red light and blue light, the red selective reflective unit is configured to reflect red light and transmit green light and blue light, projections of the plurality of blue filter units in a direction of light emitting on the base substrate are respectively overlapped with projections of green reflective units and red reflective units.

In an exemplary embodiment of the present disclosure, the selective reflective layer is arranged between the base substrate and the color film substrate, and wherein the display panel further includes a first polarizer positioned on one side of the base substrate away from the color film substrate.

In an exemplary embodiment of the present disclosure, the selective reflective layer is arranged between the base substrate and the color film substrate, and wherein the display panel further includes a first polarizer positioned between the selective reflective layer and the color film substrate.

In an exemplary embodiment of the present disclosure, the selective reflective layer is arranged between the base substrate and the color film substrate, and wherein the display panel further includes a wire grid polarization layer positioned between the selective reflective layer and the color film substrate.

In an exemplary embodiment of the present disclosure, the display panel further includes a second polarizer, the second polarizer is arranged on one side of the color film substrate away from the selective reflective layer.

According to another aspect, the present disclosure provides a display device, including: a display panel including an array substrate and a color film substrate, wherein the array substrate includes a base substrate and a selective reflective layer on the base substrate, The selective reflective layer includes at least one selective reflective unit, and wherein the selective reflective units is configured to reflect light of a first wavelength range and transmit light of a second wavelength range, and the selective reflective unit includes at least one of a green selective reflective unit, a blue selective reflective unit, and a red selective reflective unit, and wherein the green selective reflective unit is configured to reflect green light and transmit red light and blue light, and the blue selective reflective unit is configured to reflect blue light and transmit red light and green light, and the red selective reflective unit is configured to reflect red light and transmit green light and blue light, and the color film substrate is arranged opposite to the array substrate and includes a plurality of red filter units, a plurality of green filter units, and a plurality of blue filter units; a backlight source; and a brightness enhancement film, wherein the backlight source is arranged on one side of the array substrate away from the selective reflective layer, and the brightness enhancement film is arranged between the backlight source and the base substrate.

DETAILED DESCRIPTION

The technical solution of the present disclosure will be further described below according to specific embodiments of the present disclosure. The protection scope of the present disclosure is not limited to the following embodiments, which are enumerated for the purposes of example only and do not restrict the present disclosure in any way.

It should be understood that the drawings disclosed herein may not be drawn to scale in accordance with actual devices and components. The shape and thickness in the embodiments may be exaggerated in the accompanying drawings in order to clearly demonstrate the characteristics of the embodiments of the present disclosure. In addition, the structures and devices in the drawings are schematically depicted to clearly demonstrate the characteristics of the embodiments of the present disclosure.

In the present disclosure, "light of a first wavelength range" is usually a light having a specific wavelength segment within the wavelength range of the visible light, and "light of a second wavelength range" usually refers to a light having a specific wavelength segment within the wavelength range of invisible light.

Figure 1:
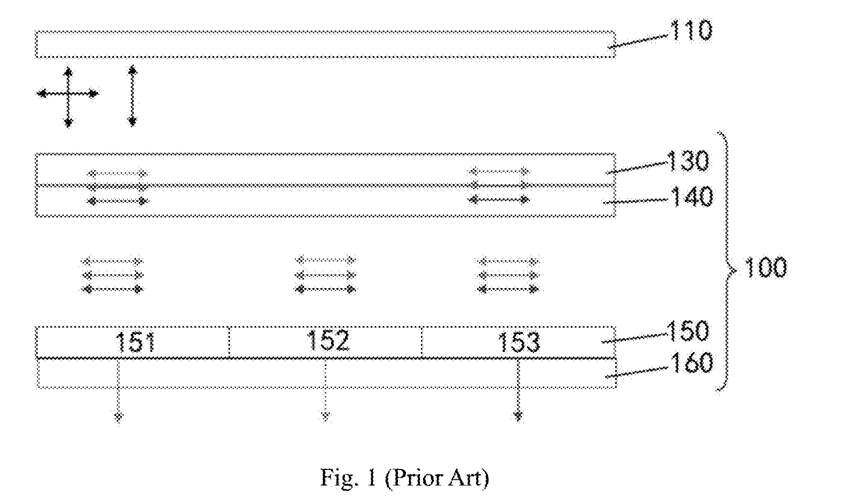
FIG. 1 is a schematic structural view of a conventional display device.

FIG. 1 is a schematic structural view of a display device disclosed by the relevant technology. As shown in FIG. 1, the display device includes a display panel 100 and a backlight source 110. The display panel 100 includes a first polarizer 130, an array substrate 140, a color film substrate 150 and a second polarizer 160, which are sequentially arranged. The backlight source 110 emits light, which passes through the first polarizer 130 and the array substrate 140, and then is incident to the substrate 150, and finally passes through the second polarizer 160 to be emitted, wherein the color film substrate 150 includes a red filter unit 151, a green filter unit 152 and a blue filter unit 153.

The color film substrate is a key part of a liquid crystal display for colorization, and has the function of absorbing a part of spectrum of the natural light, transmitting only the monochromatic spectrum that matches therewith, and forming the base color of the mixing color. For example, the red filter unit absorbs the blue light and the green light and transmits the red light, the green filter unit absorbs the blue light and the red light and transmits the green light, and the blue filter unit absorbs the green light and the red light and transmits the blue light. At present, however, the high absorption rate of color film substrate causes a waste of light, which leads to a low utilization efficiency and a low transmittance of light emitted from the backlight source, and thus more light is required to be provided from backlight source when the expected display effect is realized.

For the disadvantages of the related art, the present disclosure provides an array substrate and a display panel with high light use efficiency and transmittance. By providing a selective reflective layer, the array substrate, the display panel and the display device of the present disclosure reflect light of a first wavelength range to reuse the light, and transmit light of thereby increasing the utilization efficiency and the transmittance of the light. Wherein the light of a first wavelength range means one or more lights of a specific wavelength range such as green light, and the light of a second wavelength range means one or more lights of other wavelength range light except for the light of the first wavelength range, such as red light and blue light. For example, in case that the light of a first wavelength range includes green light, and the light of a second wavelength range includes red and blue lights rather than green light; in case that the light of a first wavelength range includes green and blue lights, and the light of a second wavelength range includes red light rather than green and blue lights.

Figure 2A:
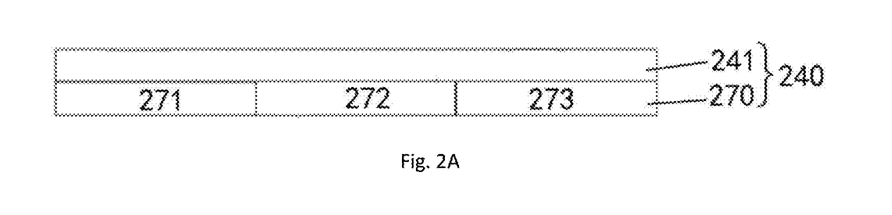
FIG. 2A is a schematic structural view of an array substrate of an embodiment of the present disclosure.

FIG. 2A is a schematic structural view of an array substrate of an embodiment of the present disclosure. As shown in FIG. 2A, the array substrate 240 includes a base substrate 241 and a selective reflective layer 270. The selective reflective layer 270 is positioned on the base substrate 241, and includes at least one selective reflective unit, for example, a selective reflective unit 271, a selective reflective unit 272 and a selective reflective unit 273.

The base substrate 241 may transmit light, which is usually a glass substrate or may be a transparent plastic substrate.

The selective reflective units 271, 272, and 273 are configured to reflect light of a first wavelength range and transmit light of a second wavelength range other than the first wavelength range. Selective reflective units 271,272, 273 may each independently be a green selective reflective unit, a blue selective reflective unit, and a red selective reflective unit. The green selective reflective unit is configured to reflect green light and transmit red light and blue light. The blue selective reflective unit is configured to reflect blue light and transmit red light and green light. The red selective reflective unit is configured to reflect red light and transmit green light and blue light.

Figure 2B:
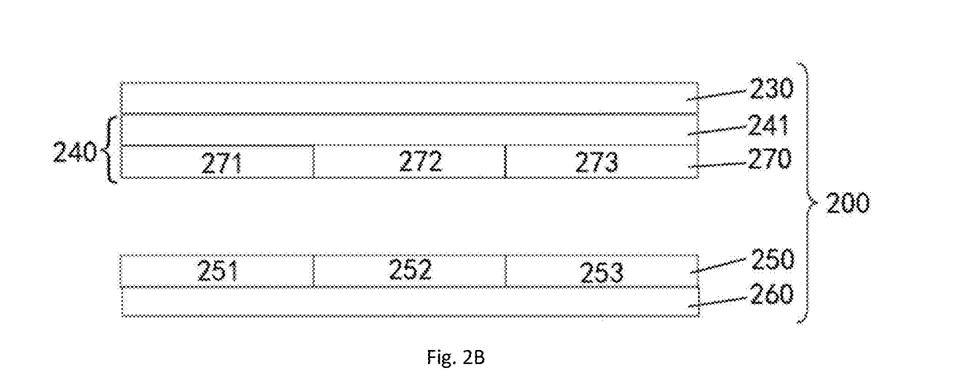
FIG. 2B is a schematic structural view of a display panel of an embodiment of the present disclosure.

FIG. 2B is a schematic structural view of a display panel of an embodiment of the present disclosure. As shown in FIG. 2B, the display panel 200 includes a first polarizer 230, an array substrate 270 (including a base substrate 241 and a selective reflective layer 270), a color film substrate 250 and a second polarizer 260, which are sequentially arranged.

The first polarizer 230 is located on one side of the base substrate 241 away from the color film substrate 250, and configured to convert the light beam produced by the light source to polarized light.

The selective reflective layer 270 is arranged between the color film substrate 250 and the base substrate 241. After the light is converted by the first polarizer 230, the light passes through the base substrate 241, and then is incident to the selective reflective layer 270. After being processed by the selective reflective layer 270, the light is incident to the color film substrate 250.

The second polarizer 260 is arranged on the emission path of the color film substrate 250, configured to parse the polarized light emitted from the color film substrate 250, so as to generate the bright and dark contrast, thereby generating display image.

The color film substrate 250 includes a plurality of filter units arranged adjacently, for example, a plurality of red filter units 251, a plurality of green filter units 252, and a plurality of blue filter unit 253. The red filter unit 251 can transmit red light and absorb green light and blue light. The green filter unit 252 can transmit green light and absorb red light and blue light. The blue filter unit 253 can transmit blue light and absorb green light and red light.

Each of the selective reflective units may correspond to one filter unit one by one. That is to say, each selective reflective unit 271 corresponds to a red filter unit 251; each selective reflective unit 272 corresponds to a green filter unit 252; and each selective reflective unit 273 corresponds to a blue filter unit 253. The size and the orientation of each of the selective reflective unites are the same as those of each of the filter units.

The selective reflective units may reflect light of a first wavelength range and transmit light of a second wavelength range other than the first wavelength range. However, each of the selective reflective units can reflect lights having different specific wavelength ranges that are not exactly the same.

Figure 2C:
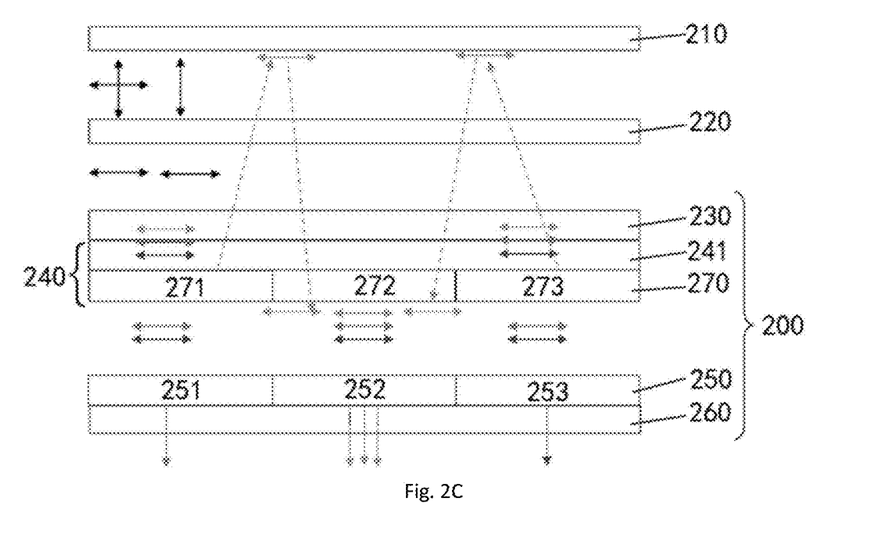
FIG. 2C is a schematic structural view of a display device of an embodiment of the present disclosure.

FIG. 2C is a schematic structural view of a display device of an embodiment of the present disclosure. As shown in FIG. 2C, the display device includes a display panel 200, a backlight source 210, and a brightness enhancement film 220. The display panel 200 includes a first polarizer 130, an array substrate 240, a color film substrate 150 and a second polarizer 250, which are arranged opposite to the display panel. The backlight source 210 is positioned on one side of the array substrate 240 away from the color film substrate 250, and the brightness enhancement film is positioned between the array substrate 240 and the backlight source 210.

The brightness enhancement film 220 can be a dual brightness enhancement film (DBEF) to improve the luminous efficiency of the whole backlight source system, which is arranged between the array substrate 240 and the backlight source 210.

As shown in FIG. 2B and FIG. 2C, the selective reflective unit 271 and the selective reflective unit 273 can be green selective reflective unit, which is configured to reflect the green light (500-570 nm) and transmit the red light (630-760 nm) and blue right (430-450 nm). The projections of the red filter unit 251 and the blue filter unit 253 on the base substrate 241 in the direction of light emitting are respectively overlapped with the selective reflective unit 271 and the selective reflective unit 273. A plurality of selective reflective unit 272 are the red selective reflective unit and/or the blue selective reflective unit, wherein the red selective reflective unit is configured to reflect red light and transmit green light and blue light, and the blue selective reflective unit is configured to reflect blue light and transmit red light and green light. At the same time, the projections of the plurality of green filter units 252 on the base substrate 241 in the direction of light emitting are respectively overlapped with the red reflective unit and/or the blue selective reflective unit. Wherein, "and/or" solution includes three solutions: one "and" solution, and two "or" solution. For example, A plurality of selective reflective unit 272 are the red selective reflective unit and/or the blue selective reflective unit includes solutions: A plurality of selective reflective unit 272 are the red selective reflective units; A plurality of selective reflective units 272 are the blue selective reflective unit; and A plurality of selective reflective units 272 are the red selective reflective units and the blue selective reflective units.

Therefore, when the light emitted from the backlight source 210 is incident to the selective reflective unit 271, the red light and the blue light of the light beam are transmitted and the green light is reflected, and then the red light and the blue light, which pass the selective reflective unit 271, are further incident to the red filter unit 251, and the reflected green light is reflected again on the surface of the backlight source 210. A part of the reflected green light is directly incident to the selective reflective unit 272 and is passed and then is incident to the green filter unit 252, and another part of the reflected green light is incident to other selective reflective unit 271 or the selective reflective unit 273, which is reflected back to the surface of the backlight source 210 again. The above process is repeated until the light passes through a certain selective reflective unit 272 and is finally incident into the green filter unit 252, thereby increasing utilization efficiency and the transmittance of the green light.

Similarly, when the light emitted from backlight source 210 is incident to the selective reflective unit 273, the red light and the blue light of the light beam are transmitted and the green light is reflected, and then the red light and the blue light, which pass the selective reflective unit 273, are further incident to the blue filter unit 253, and the reflected green light is reflected again on the surface of the backlight source 210. A part of the reflected green light is directly incident to the selective reflective unit 272 and is passed and then is incident to the green filter unit 252, and another part of the reflected green light is incident to other selective reflective unit 271 or the selective reflective unit 273, which is reflected back to the surface of the backlight source 210 again. The above process is repeated until the light passes through a certain selective reflective unit 272 and is finally incident into the green filter unit 252.

In another embodiment, the selective reflective unit 272 and the selective reflective unit 273 can be red selective reflective unit, which is configured to reflect the red light and transmit the green light and the blue light, and the projections of the green filter unit 252 and the blue filter unit 253 on the base substrate 241 in the direction of light emitting are respectively overlapped with the selective reflective unit 272 and the selective reflective unit 273. The selective reflective unit 271 is the green selective reflective unit and/or the blue selective reflective unit, wherein the green selective reflective unit is configured to reflect green light and transmit red light and blue light, and the blue selective reflective unit is configured to reflect blue light and transmit red light and green light. At the same time, the projections of the plurality of red filter units 251 on the base substrate 241 in the direction of light emitting are respectively overlapped with the green reflective unit and/or the blue selective reflective unit. By means of the present configuration, the light utilization efficiency and the light transmittance can be improved.

In a further embodiment, the selective reflective unit 271 and the selective reflective unit 272 can be blue selective reflective units, which are configured to reflect the blue light and transmit the green light and the red light, and the projections of the red filter unit 251 and the green filter unit 252 on the base substrate 241 in the direction of light emitting are respectively overlapped with the selective reflective unit 271 and the selective reflective unit 272. The selective reflective unit 273 is the red selective reflective unit and/or the green selective reflective unit, wherein the red selective reflective unit is configured to reflect green light and transmit green light and blue light, and the green selective reflective unit is configured to reflect green light and transmit red light and blue light. At the same time, the projections of the plurality of blue filter units 253 on the base substrate 241 in the direction of light emitting are respectively overlapped with the red reflective unit and/or the green selective reflective unit. By means of the present configuration, the utilization efficiency and transmittance of blue light can be improved.

The red filter unit 251, the green filter unit 252, and the blue filter unit 253 in the color film substrate 250 may absorb light through the corresponding selective reflective unit, the color of which is different from that of the color film substrate, to ensure that the light that enters into filter substrate unit has colors that is different from the color of the color film substrate. For example, the red light color film of the red filter unit 251 may absorb the blue light through the selective reflective unit 271, thus ensuring that the light that enters into the red filter unit 251 is red light. the blue light color film of the blue filter unit 253 may absorb the red light through the selective reflective unit 273, thus ensuring that the light that enters into the red filter unit 253 is blue light.

It should be noted that the selective reflective unit can be arranged on a part of the filter units, while there is no selective reflective unit arranged above the remaining filter units. For example, when the selective reflective unit 271 and the selective reflective unit 273 are green selective reflective unit that reflects the green light and transmit the red light and the blue light, the selective reflective units 271, 273 are arranged above only the red filter unit 251 and the blue filter unit 253. There is not any selective reflective unit arranged above the green filter unit 252 so as to transmit the green light, during which the function of the selective reflective layer 270 is mainly to improve the green light utilization efficiency and transmittance.

In other embodiments, the selective reflective unit 272 can transmit the green light and reflect the red light and the blue light, during which the function of the selective reflective layer 270 is mainly to improve utilization efficiency and transmittance of the green light and the blue light. The selective reflective unit 272 can further transmit the green light and reflect the blue light and the red light, during which the function of the selective reflective layer 270 is mainly to improve utilization efficiency and transmittance of the green light and the red light. The selective reflective unit 272 can also transmit the green light and reflect the blue light and the red light, during which the function of the selective reflective layer 270 is mainly to improve utilization efficiency and transmittance of the green light, the red light, and the blue light.

The selective reflecting unit of the present disclosure is not limit to the above combinations, and may include other combinations. For example, when the selective reflective unit 271 reflects the green light and transmits the red light and the blue light, the selective reflective unit 273 may reflect the red light and transmit the green light and the blue light, and the selective reflective unit 272 may reflect the blue light and transmits the green light and the red light, or the selective reflective unit 272 may reflect the red light and transmit the green light and the blue light, thus increasing the utilization efficiency and transmittance of two or more kinds of lights.

On this basis, in order to make full use of the function of each selective reflective unit to improve the light utilization efficiency, the first wavelength range can be further enlarged. For example, when the selective reflective unit 271 reflects the green light and the blue light and transmits the red light, the selective reflective unit 272 may reflect the red light and the blue light and transmit the green light, and the selective reflective unit 273 may reflect the green light and the red light and transmit the blue light. Therefore, when the light emitted from the backlight source 210 is incident to the selective reflective unit 271, the red light of the light beam is transmitted while the green light and the blue light are reflected, and then the red light passed through is further incident to the red filter unit 251, and the reflected green light and the reflected blue light are reflected on the surface of the backlight source 210 again. A part of the reflected green light is directly incident to the selective reflective unit 272 and is passed and then is incident to the green filter unit 252, and another part of the reflected green light is incident to other selective reflective unit 271 or the selective reflective unit 273, which is reflected back to the surface of the backlight source 210 again. The above process is repeated until the light passes through a certain selective reflective unit 272 and is finally incident into the green filter unit 252. Similarly, a part of the reflected blue light is directly incident to the selective reflective unit 273 and is passed and then is incident to the blue filter unit 253, and another part of the reflected blue light is incident to other selective reflective unit 271 or the selective reflective unit 272, which is reflected back to the surface of the backlight source 210 again. The above process is repeated until the light passes through a certain selective reflective unit 273 and is finally incident into the blue filter unit 253.

Similarly, the above process is repeated when the light emitted from the backlight source 210 is incident to the selective reflective unit 272 or the selective reflective unit 273, and finally, by means of the selective reflective layer 270, the red light, the green light and the blue light which are incident thereto pass through the respective selective reflective unit, and the reflected lights after they are reflected many times can pass through the respective selective reflective unit corresponding to the light having the respective wavelength range, thus improving the utilization efficiency and transmittance of lights.

Compared with the structure of the related art, the display panel as shown in FIG. 2B and the display device as shown in FIG. 2C can increase the transmittance by more than 20%.

Figure 3A:
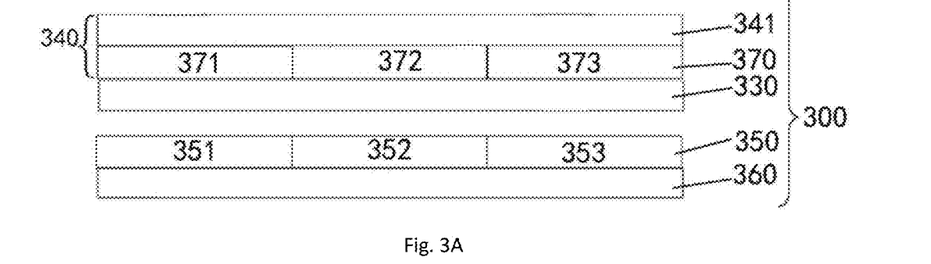
FIG. 3A is a schematic structural view of a display panel of another embodiment of the present disclosure.

FIG. 3A is a schematic structural view of a display panel of another embodiment of the present disclosure. As shown in FIG. 3A, the display panel 300 includes an array substrate 340 (including a base substrate 341 and a selective reflective layer 370), a first polarizer 330, a color film substrate 350 and a second polarizer 360, which are sequentially arranged. The selective reflective layer 370 includes a plurality of selective reflective units 371, 372, 373. The color film substrate 350 includes a plurality of filter units arranged adjacently, for example, a plurality of red filter units 351, a plurality of green filter units 352, and a plurality of blue filter unit 353.

Compared with the previous embodiment, the positions of the base substrate 341, the selective reflection layer 370, the color film substrate 350 and the second polarizer 360 are identical with those of the preceding ones, but the difference is that the position of the first polarizer 330 is different.

As shown in FIG. 2B, the first polarizer 230 is arranged on the base substrate 241 and positioned between the light source and the selective reflective layer 270, such that the lights that are reflected many times between the selective reflective layer 270 and the light source pass through the first polarizer 230. After the light is reflected many times to cause a great loss of light, the final utilization efficiency and transmittance of light are significantly increased.

As shown in FIG. 3A, after the first polarizer 330 is arranged on the selective reflective layer 370 and between the selective reflective layer 370 and the color film substrate 350 (i.e. POL in-cell), the reflected light between the selective reflective layer 370 and the backlight source 310 does not pass through the first polarizer 330. Therefore, even if the light is reflected many times, the loss of light is not great, and utilization efficiency and transmittance of light are significantly increased.

Compared with the structure of the related art, the display panel as shown in FIG. 3A can increase the transmittance by more than 30% to 100%.

Figure 3B:
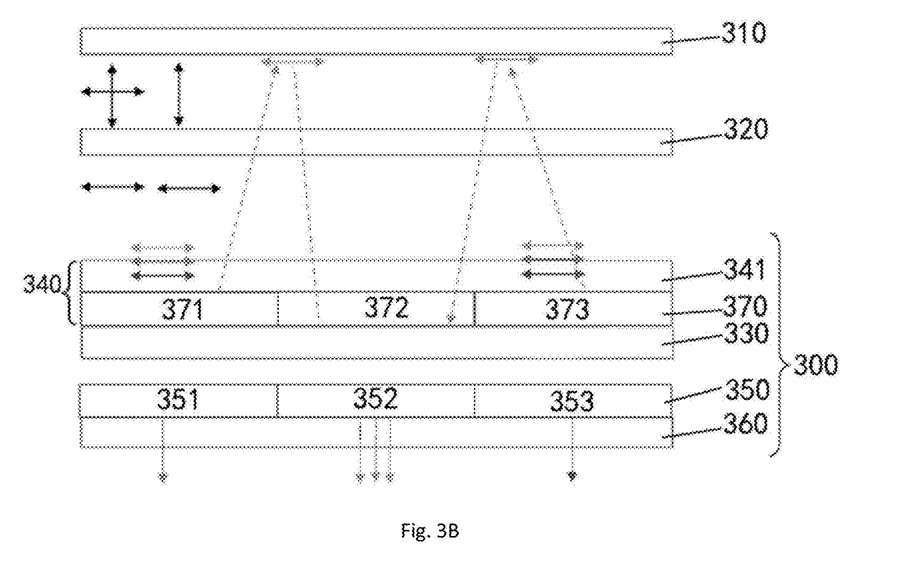
FIG. 3B is a schematic structural view of a display device of another embodiment of the present disclosure.

FIG. 3B is a schematic structural view of a display device of another embodiment of the present disclosure. As shown in FIG. 3B, the display device includes a display panel 300, a backlight source 310, and a brightness enhancement film 320. The display panel 300 is arranged under the backlight source 310 and the brightness enhancement film 320.

Figure 4:
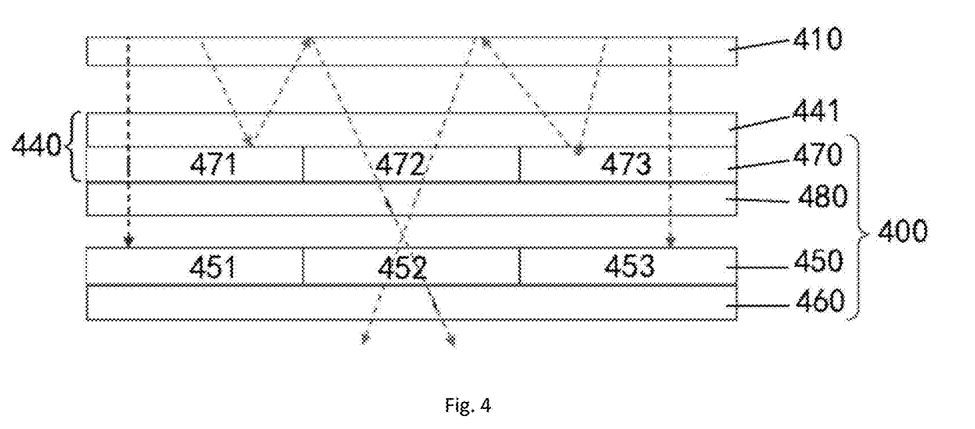
FIG. 4 is a schematic structural view of a display device of a further embodiment of the present disclosure.

FIG. 4 is a schematic structural view of a display device of a further embodiment of the present disclosure. As shown in FIG. 4, the display device includes a display panel 400 and a backlight source 410. The display panel 400 is arranged under the backlight source 410. As shown in FIG. 3A, the display panel 400 includes an array substrate 440 (including a base substrate 441 and a selective reflective layer 470), a wire grid polarization layer (WGP) 480, a color film substrate 450 and a second polarizer 460, which are sequentially arranged. The selective reflective layer 470 includes a plurality of pixelated selective reflective units 471, 472, 473. The color film substrate 450 includes a plurality of filter units arranged adjacently, for example, a plurality of red filter units 451, a plurality of green filter units 452, and a plurality of blue filter unit 453.

Compared with the previous embodiment shown in FIG. 3B, the positions of the base substrate 441, the selective reflection layer 470, the color film substrate 450 and the second polarizer 460 are identical with those of the preceding ones, but the difference is that the wire grid polarization layer (WGP) 480 is employed to replace the first polarizer 330.

The wire grid polarization layer 480 is configured to produce polarized light in one direction. By arranging the wire grid polarization layer 480 is arranged between the selective reflective layer 470 and the color film substrate 450, the loss of the reflected light between the selective reflective layer 370 and the backlight source 310 can also be greatly reduced, and utilization efficiency and transmittance of light are significantly increased.

As an example, the red selective reflective unit and the blue selective reflective unit, which reflect the green light and transmit the red light and the blue light, are employed. The example is used to describe how to make the selective reflective units to realize the function of reflecting light of a first wavelength range and transmitting light of a second wavelength range other than the first wavelength range.

A high reflective film made by stacking a plurality of dielectric layers is employed in the present disclosure to realize the above function. In particular, the selective reflective unit is made by stacking a plurality of first dielectric layers (high refractive index film) and a plurality of second dielectric layers (low refractive index film). As to the stacking way, please see formula (1) below:

$$A|H(LH)^S|G \tag{1}$$

wherein H represents a high refractive index film, L represents a low refractive index film, A represents the air, G represents the base substrate, and S represents the dielectric film deposition cycles.

Therefore, in the stacking structure of the present disclosure, the refractive index of the first dielectric layer is greater than that of the second dielectric layer, and the number of the first dielectric layers is larger than that of the second dielectric layer by one. That is to say, the second dielectric layer is sandwiched between the first dielectric layers that contact the air and the base substrate.

The thickness of the first dielectric layer and the second dielectric layer is configured to be in a first range to realize the reflection in the first wavelength range and transmission in the second wavelength range. For example, the thickness of the first dielectric layer and the second dielectric layer is a quarter of the first wavelength range. For example, the thickness of the first dielectric layer and the second dielectric layer is 125 nm-142.5 nm, when they are designed to reflect green light (500-570 nm). For example, the thickness of the first dielectric layer and the second dielectric layer is 157.5 nm-190 nm, when they are designed to reflect red light (630-760 nm). For example, the thickness of the first dielectric layer and the second dielectric layer is 107.5 nm-112.5 nm, when they are designed to reflect red light (430-450 nm).

The transmittance and the reflectance of the film system can be obtained by the following formulae (2) and (3), in which $n_L$ is the refractive index of the light of a certain wavelength range in the second dielectric lay (low refractive index film), $n_H$ is the refractive index of the light of this wavelength range in the first dielectric lay (high refractive index film), $n_g$ is the refractive index of the light of this wavelength range in the air, S is the dielectric film deposition cycles.

$$R \approx 1 - 4\left(\frac{n_L}{n_H}\right)^{2S} \cdot \frac{n_g}{n_H^2} \quad (2)$$

$$T = 1 - R \approx 4\left(\frac{n_L}{n_H}\right)^{2S} \cdot \frac{n_g}{n_H^2} \quad (3)$$

The bandwidth of the reflective band may be obtained by the formula (4) below.

$$\Delta g = \frac{2}{\pi}\sin^{-1}\left(\frac{n_H - n_L}{n_H + n_L}\right) = \frac{2}{\pi}\sin^{-1}\left[\frac{1 - \frac{n_L}{n_H}}{1 + \frac{n_L}{n_H}}\right] \quad (4)$$

Figure 5:
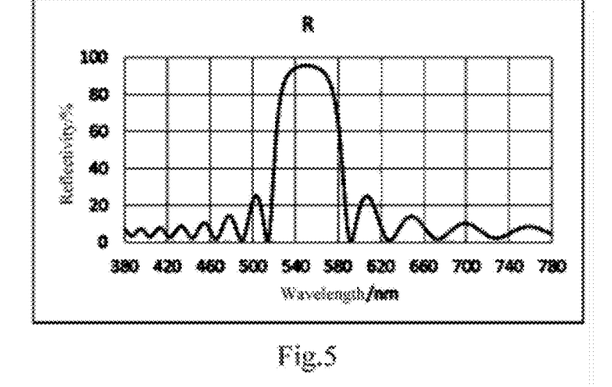
FIG. 5 is a diagram of a relation between wavelength range and reflectivity of a selective reflective unit of an embodiment of the present disclosure.
Figure 6:
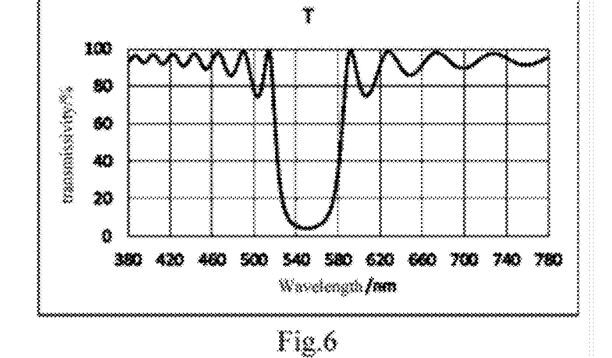
FIG. 6 is a diagram of a relation between wavelength range and transmissivity of a selective reflective unit of an embodiment of the present disclosure.

As an example, when the first dielectric layer is an $Al_2O_3$ layer, the second dielectric layer is a $SiO_2$ layer and S is 15, the wavelength range-reflectance diagram and wavelength range-transmittance diagram are shown in FIGS. 5 and 6 respectively.

It can be seen from the two diagrams that, when the selective reflective unit is manufactured to correspond to the red band and the blue band, the selective reflective unit reflects the light in the green band, so as to repeatedly use the light in the green band, thus improving the utilization efficiency and transmittance of green light.

The display device of the present disclosure includes the above display panel, and the display device can be any product or part with display function, such as mobile phone, tablet computer, TV set, monitor, notebook computer, digital photo frame, navigator, and etc.

Of course, the display device of the present disclosure also has other structural components of a conventional display device, such as the outer frame and the like.

Those skilled in the art should note that, the embodiments described in the present disclosure are merely exemplary, and various other substitutions, modifications and improvements can be made within the scope of the present disclosure. Therefore, the present disclosure is not limited to the above embodiments, but only by claims.

What is claimed is:

1. An array substrate, comprising:
   a base substrate; and
   a selective reflective layer on the base substrate;
   wherein the selective reflective layer comprises at least one selective reflective unit;
   the at least one selective reflective unit is configured to reflect light of a first wavelength range and transmit light of a second wavelength range,
   wherein the selective reflective units comprise a plurality of first dielectric layers and a plurality of second dielectric layers, which are alternately stacked, and the refractive index of the first dielectric layer is greater than the refractive index of the second dielectric layer, and the number of the first dielectric layers is larger than the number of the second dielectric layer by one.

2. The array substrate according to claim 1, wherein the selective reflective units comprise at least one of a green selective reflective unit, a blue selective reflective unit, and a red selective reflective unit, wherein the green selective reflective unit is configured to reflect green light and transmit red light and blue light, and the blue selective reflective unit is configured to reflect blue light and transmit red light and green light, and the red selective reflective unit is configured to reflect red light and transmit green light and blue light.

3. The array substrate according to claim 1, wherein the first dielectric layer is an $Al_2O_3$ layer and the second dielectric layer is a $SiO_2$ layer, wherein both the thickness of the first dielectric layer and the thickness of the second dielectric layer are a quarter of the first wavelength range.

4. A display panel, comprising:
   an array substrate, comprising a base substrate and a selective reflective layer on the base substrate, wherein the selective reflective layer comprises at least one selective reflective unit, the selective reflective unit is configured to reflect light of a first wavelength range and transmit light of a second wavelength range, and
   a color film substrate arranged opposite to the array substrate,
   wherein the selective reflective units comprise a plurality of first dielectric layers and a plurality of second dielectric layers, which are alternately stacked, and the refractive index of the first dielectric layer is greater than the refractive index of the second dielectric layer, and the number of the first dielectric layers is larger than the number of the second dielectric layer by one.

5. The display panel according to claim 4, wherein the color film substrate comprises a plurality of red filter units, a plurality of green filter units, and a plurality of blue filter units.

6. The display panel according to claim 5, wherein the selective reflective layer comprises a plurality of green selective reflective units,
   projections of the plurality of red filter units and the plurality of blue filter units on the base substrate in a direction of light emitting are respectively overlapped with projections of the green reflective units.

7. The display panel according to claim 6, wherein the selective reflective layer further comprises a plurality of red selective reflective units or a plurality of blue selective reflective units, projections of the plurality of green filter units in a direction of light emitting on the base substrate are respectively overlapped with projections of the red reflective units and/or the blue reflective units.

8. The display panel according to claim 5, wherein the selective reflective layer comprises a plurality of red selective reflective units, wherein the red selective reflective units are configured to reflect red light and transmit green light and blue light, projections of the plurality of green filter units and the plurality of blue filter units in a direction of light emitting on the base substrate are respectively overlapped with projections of red reflective unit.

9. The display panel according to claim 8, wherein the selective reflective layer further comprise a plurality of green selective reflective units or a plurality of blue selective reflective units, wherein the green selective reflective unit is configured to reflect green light and transmit red light and blue light, and the blue selective reflective unit is configured to reflect blue light and transmit red light and green light, projections of the plurality of red filter units in a direction of light emitting on the base substrate are respectively overlapped with projections of the green reflective units and/or the blue reflective units.

10. The display panel according to claim 5, wherein the selective reflective layer comprises a plurality of blue selective reflective units, and the blue selective reflective unit is configured to reflect blue light and transmit red light and green light, projections of the plurality of green filter units and the plurality of red filter units in a direction of light emitting on the base substrate are respectively overlapped with projections of the blue reflective units.

11. The display panel according to claim 10, wherein the selective reflective layer further comprise a plurality of green selective reflective unit or a plurality of red selective reflective unit, wherein the green selective reflective unit is configured to reflect green light and transmit red light and blue light, the red selective reflective unit is configured to reflect red light and transmit green light and blue light, projections of the plurality of blue filter units in a direction of light emitting on the base substrate are respectively overlapped with projections of green reflective units and red reflective units.

12. The display panel according to claim 4, wherein the selective reflective layer is arranged between the base substrate and the color film substrate, and wherein the display panel further comprises a first polarizer positioned on one side of the base substrate away from the color film substrate.

13. The display panel according to claim 5, wherein the selective reflective layer is arranged between the base substrate and the color film substrate, and wherein the display panel further comprises a first polarizer positioned between the selective reflective layer and the color film substrate.

14. The display panel according to claim 4, wherein the selective reflective layer is arranged between the base substrate and the color film substrate, and wherein the display panel further comprises a wire grid polarization layer positioned between the selective reflective layer and the color film substrate.

15. The display panel according to claim 5, wherein the display panel further comprises a second polarizer, the second polarizer is arranged on one side of the color film substrate away from the selective reflective layer.

16. A display device, comprising:
a display panel, comprising an array substrate and a color film substrate, wherein the array substrate comprises a base substrate and a selective reflective layer on the base substrate, wherein the selective reflective layer comprises at least one selective reflective unit, and the at least one selective reflective unit is configured to reflect light a first wavelength range and transmit light of a second wavelength range, and the selective reflective unit comprises at least one of a green selective reflective unit, a blue selective reflective unit, and a red selective reflective unit, and wherein the green selective reflective unit is configured to reflect green light and transmit red light and blue light, and the blue selective reflective unit is configured to reflect blue light and transmit red light and green light, and the red selective reflective unit is configured to reflect red light and transmit green light and blue light, and the color film substrate is arranged opposite to the array substrate and comprises a plurality of red filter units, a plurality of green filter units, and a plurality of blue filter units,
a backlight source; and
a brightness enhancement film,
wherein the backlight source is arranged on one side of the array substrate away from the selective reflective layer, and the brightness enhancement film is arranged between the backlight source and the base substrate,
wherein the selective reflective units comprise a plurality of first dielectric layers and a plurality of second dielectric layers, which are alternately stacked, and the refractive index of the first dielectric layer is greater than the refractive index of the second dielectric layer, and the number of the first dielectric layers is larger than the number of the second dielectric layer by one.

17. The display panel according to claim 6, wherein the selective reflective layer further comprises a plurality of red selective reflective units and a plurality of blue selective reflective units, projections of the plurality of green filter units in a direction of light emitting on the base substrate are respectively overlapped with projections of the red reflective units and/or the blue reflective units.

18. The display panel according to claim 8, wherein the selective reflective layer further comprise a plurality of green selective reflective units and a plurality of blue selective reflective units, wherein the green selective reflective unit is configured to reflect green light and transmit red light and blue light, and the blue selective reflective unit is configured to reflect blue light and transmit red light and green light, projections of the plurality of red filter units in a direction of light emitting on the base substrate are respectively overlapped with projections of the green reflective units and/or the blue reflective units.

19. The display panel according to claim 10, wherein the selective reflective layer further comprise a plurality of green selective reflective unit and a plurality of red selective reflective unit, wherein the green selective reflective unit is configured to reflect green light and transmit red light and blue light, the red selective reflective unit is configured to reflect red light and transmit green light and blue light, projections of the plurality of blue filter units in a direction of light emitting on the base substrate are respectively overlapped with projections of green reflective units and red reflective units.

* * * * *